United States Patent Office 3,567,786
Patented Mar. 2, 1971

3,567,786
OXIDATION OF TERTIARY ALKYL-SUBSTITUTED ARYL COMPOUND TO TERTIARY ALCOHOL
Logan C. Bostian, William D. Griffin, and Zalik Oser, Morris Township, Morris County, N.J., assignors to Allied Chemical Corporation, New York, N.Y.
No Drawing. Continuation of application Ser. No. 165,960, Jan. 12, 1962. This application July 31, 1967, Ser. No. 659,559
Int. Cl. C07c *31/14, 73/06*
U.S. Cl. 260—618      5 Claims

ABSTRACT OF THE DISCLOSURE

The production of tertiary alcohols by oxidizing a tertiary aliphatic carbon atom in an organic compound in which said tertiary carbon atom is attached to one carbon of a carbocyclic aryl nucleus, to one hydrogen atom, to two other saturated carbon atoms each in turn attached only to a member of the group consisting of carbon atoms and hydrogen atoms, in liquid phase with a gas containing elemental oxygen and with aqueous caustic of the group consisting of sodium hydroxide and potassium hydroxide in concentrations of about 40–90 weight percent in the aqueous solution and in proportions of about 20–400 grams of the aqueous caustic solution per 100 ml. of the compounds, at temperatures in the range of about 100° C.–300° C.

---

This application is a continuation of application S.N. 165,960 filed Jan. 12, 1962 and now abandoned.

This invention relates to the oxidation of a tertiary aliphatic carbon atom attached to a carbocyclic aryl nucleus in an aralkyl organic compound to produce a tertiary alcohol therefrom, by a gas containing elemental oxygen and under conditions forming high yields of the alcohol in the oxidation products. Such tertiary aliphatic carbon atom will be attached to one carbon atom of a carbocyclic aryl nucleus, to one hydrogen atom, and to two other saturated carbon atoms each attached only to carbon atoms and/or to hydrogen atoms. The tertiary aliphatic carbon atoms to which our invention applies can be seen to be $\overset{*}{C}$ in compounds of the formula

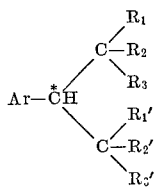

wherein Ar represents an aryl group, permissibly substituted and the R's represent hydrogen or groups attached by a carbon atom to the C's shown in the above formula.

We have discovered that aralkyl compounds containing a tertiary aliphatic carbon atom attached to a carbocyclic aryl nucleus can be oxidized with a gas containing elemental oxygen such as air at good rates and in excellent yields to the corresponding tertiary alcohol when the oxidation is conducted in liquid phase at temperatures of at least about 80° C. in the presence of dispersed aqueous caustic of the group consisting of sodium hydroxide and potassium hydroxide in a strictly limited concentration of caustic in the aqueous solution and strictly limited proportion of aqueous caustic solution to organic phase. The specific concentration of aqueous caustic to be used in accordance with our invention is about 40–90% by weight and the specific proportion of this aqueous caustic solution to be used is about 20–400 grams per 100 ml. of the organic phase.

Aralkyl compounds which have proved to give especially good yields of carbinol when oxidized by our process are aralkyl hydrocarbons containing no primary alkyl group attached to the aryl nucleus, including isopropylbenzene (i.e. cumene), beta-isopropylnaphthalene, p-diisopropylbenzene, m-diisopropylbenzene, 1,3,5-triisopropylbenzene and phenylcyclohexane; the isopropylphenyl dimethyl carbinols obtained upon oxidizing one isopropyl group in a di- or triisopropylbenzene and by oxidizing two isopropyl groups in a triisopropylbenzene; and the halocumenes such as p-fluorocumene. Other examples of compounds with tertiary aliphatic carbon atoms attached to an aryl nucleus, oxidizable to tertiary alcohols by our process, include sec. butylbenzene, cymene, etc.

We have found it is critical in our process to use water as the solvent for the caustic, rather than no solvent or other solvents therefor such as alcohols; and to use sodium hydroxide or potassium hydroxide rather than other alkaline materials. Solid caustic has been found to become inactive as a catalyst after a short time, allowing hydroperoxide to accumulate; and caustic in e.g. n-butyl alcohol solvent has been found to inhibit cumene oxidation.

We have moreover found use of caustic concentration of at least about 40% is critical for obtaining carbinol as 95% or more of our oxidation product. Still higher carbinol yields, up to practically quantitative yields, are obtained as the caustic concentration is increased to as high as 60%. Our products contain practically no ketone, so that carbinol of high purity can easily be recovered from the products of our process.

At temperatures much below 100° C. the oxidation is slower and the yields of carbinol obtained by our process fall off as compared to hydroperoxide, so that a temperature of at least about 80° C. should be used. Higher temperatures are preferable, ranging from about 100° C. to about 150° C.; and temperatures up to the boiling point of the reaction mixture under the prevailing pressure can be used. For oxidation of high boiling relatively stable compounds such as polystyrene temperatures as high as 300° C. are suitable.

For oxidizing an isopropylbenzene, e.g. cumene, a diisopropylbenzene, or a triisopropylbenzene, and for oxidizing an isopropylphenyl dimethyl carbinol or a bis-(a-hydroxyisopropyl)-cumene preferred temperatures are in the range of about 100°–130° C.; for an isopropylnaphthalene preferred temperatures are about 120°–150° C.; and for a tertiary carbon attached to secondary carbon as in phenylcyclohexane and sec. butylbenzene preferred temperatures are about 120°–150° C. Higher temperatures tend to cause side reactions whereby the carbinol products may be contaminated with ketones, especially when the oxygen dispersion is relatively poor or its partial pressure is low.

Pressure will usually be substantially atmospheric for convenience, but higher pressures can be used to increase the oxygen partial pressure and/or allow use of reaction temperatures above the atmospheric pressure boiling point of the reaction mixture.

Suitably the aralkyl compound is introduced into a reaction vessel equipped with a gas inlet tube, stirrer, thermometer, and reflux condenser and aqueous caustic is introduced at concentrations of about 40–90% and in proportion of about 20–400 grams per ml. of the aralkyl compound. Especially good results are obtained using about 50 grams of 40%–60% sodium hydroxide per 100 ml. of the aralkyl compound. The reaction mixture is brought to a temperature in the range between about 100° C. and the atmospheric pressure boiling point of the reaction mixture, and is vigorously agitated while air is bubbled through the reaction mixture, e.g. at a rate of about 30–50 liters per hour per liter of organic liquid. When gas of higher oxygen content than air is used a slower flow rate is suitable. The flow rate should provide more oxygen than the reaction consumes, so that an exit gas containing oxygen will be found. The oxidation is continued at least until a substantial amount of the aralkyl compound has been converted to the corresponding tertiary alcohol; and can be continued to high levels of reaction of the hydrocarbon without side reactions.

The reason why oxidation under our conditions leads substantially exclusively to production of tertiary alcohol versus ketone is not fully understood but may involve or be connected with oxidation under our conditions to form alkali metal salt of the tertiary hydroperoxide, which salt rapidly decomposes under the specific conditions of temperature, alkali concentration in water, and proportion of aqueous alkali employed in our process.

The following examples set forth specific embodiments of our process illustrative of the best mode contemplated by us of carrying out our invention, but the invention is not to be interrupted as limited to all details of the examples. "%" herein means weight percent.

EXAMPLE 1

The runs summarized in the table below were carried out with cumene in a resin pot equipped with a motor driven stirrer, gas inlet tube, thermometer and reflux condenser at temperature of 100° C. and with air bubbled through the liquid at a rate of about 50 liters per hour per liter of organic liquid.

The reaction mixture at the end of the run was allowed to cool and the aqueous and organic layers were separated. Dimethylphenyl carbinol was determined in the organic layer by spectrometric methods. These methods showed only a trace of ketone in each of the reaction products. Hydroperoxide was determined in the organic layer by a standard iodometric method.

The table shows in the successive colums the grams of aqueous sodium hydroxide employed per 100 ml. of hydrocarbon, the concentration of aqueous sodium hydroxide employed, the maximum observed rate of production of oxidation products expressed as grams of oxidation product formed per hour per 100 grams of the water organic phase, the weight ratio of dimethylphenyl carbinol:hydroperoxide formed, and the percent of hydrocarbon reacted.

TABLE I

| Run No.: | Grams aqueous NaOH, 100 ml. cumene | NaOH, conc., wgt. percent | Maximum rate | Carbinol: hydroperoxide, wgt. ratio | Percent cumene reacted |
|---|---|---|---|---|---|
| 1 | 200 | 40 | 2.8 | 46 | 69 |
| 2 | 50 | 40 | 4.9 | 54 | 56 |
| 3 | 50 | 60 | 2.9 | 122 | 62 |
| 4 | 25 | 40 | 2.1 | 33 | 66 |
| 5 | 400 | 40 | 2.0 | 54 | 60 |
| 6 | 50 | 30 | 6.0 | 9 | 57 |

From the above table it can be seen that as a function of alkali concentration, the carbinol: hydroperoxide ratio (i.e. carbinol yield) rises very rapidly between 30 weight percent and 40 weight percent NaOH concentration and continues to rise up to a 60 weight percent NaOH concentration but the rate of oxidation falls off over the same range. Moreover the carbinol yield and the rate of oxidation both fall off considerably at proportions as low as 25 grams of NaOH solution per 100 ml. of cumene; and rate falls off at higher proportions such as 400 grams NaOH solution per 100 ml. of cumene.

EXAMPLE 2

The runs tabulated in Table II below were carried out essentially as in Example 1 above using 50 grams of 40% aqueous NaOH per 100 ml. of each of the hydrocarbons specified in Table II and using the temperatures and times specified in Table II. The carbinol or carbinols obtained in each run of Table II was a product in which the tertiary aliphatic carbon atom or atoms attached to the aryl nucleus was oxidized to the corresponding tertiary alcohol, with practically no ketone being formed.

TABLE II

| Run No.: | Hydrocarbon | Temp., ° C. | Hours | Carbinol: hydroperoxide wgt. ratio | Percent hydrocarbon reacted |
|---|---|---|---|---|---|
| 1 | beta-Isopropylnaphthalene | 125 | 32 | 108 | 55 |
| 2 | p-Diisopropylbenzene | 100 | 14 | [1] 22 | 45 |
| 3 | m-Diisopropylbenzene | 100 | 16 | [1] 32 | 65 |
| 4 | Phenylcyclohexane | 125 | 14 | 40 | 21 |
| 5 | Cymene | 120–106 | 71 | 5.5 | (1) |

[1] Mono and diols.

NOTE (1): Cymene was oxidized by oxygen at flow rate of 67 liters per liter of reaction mixture. The cymene oxidation products were worked up by adding water (100 ml. per 100 ml. of cymene used), separating layers, analyzing the organic layer by vapor fractometer, and acidifying the aqueous layer to separate cumic acid as the only substantial by-product, amounting to about 20 mol percent of the total oxidation product. The carbinol was 19% of the organic layer; aldehydes and ketones were not above 0.1% of the organic layer.

EXAMPLE 3

The run outlined in Table III below demonstrates the effectiveness of potassium hydroxide when substituted for sodium hydroxide in oxidizing cumene to dimethylphenyl carbinol. This run was made by the procedure of Example 1 above except using 50 grams of 56% aqueous KOH per 100 ml. of cumene. The headings of Table III have the same significance (substituting KOH for NaOH) as those of Table I.

TABLE III

| | |
|---|---|
| Gms. aq. KOH 100 ml. cumene | 50 |
| KOH conc. wgt. percent | 56 |
| Maximum rate | 2.2 |
| Carbinol: hydroperoxide wgt. ratio | 136 |
| Percent cumene reacted | 55 |

EXAMPLE 4

Para-diisopropylbenzene was oxidized to a mixture of mono- and dicarbinol in a semi-continuous reaction at 100° C. in the presence of 50 grams of 40% aqueous NaOH per 100 ml. of organic phase in a well stirred reaction vessel with air bubbled through as in Example 1. At the end of each cycle the organic phase was decanted from the aqueous phase and cooled at 50° C. The solid products which crystallized out were filtered, and the filtrate was recycled to the oxidizer together with the aqueous NaOH phase. Fresh p-diisopropylbenzene in quantity to maintain a constant quantity of organic material was supplied. The results are set forth in Table IV below, in which the column heading "p-Di-iPrB" signifies p-diisopropylbenzene; and "Mono ol" and "Diol" signify respectively p-isopropyl-alpha, alpha-dimethylbenzyl alcohol and 1,4-bis-(alpha-hydroxyisopropyl)benzene.

TABLE IV

| Cycle No. | Hours | Organic phase composition in wgt. percent at start of each cycle | | | Crude filter cake, gms. | Filter cake composition, wgt. percent | | |
|---|---|---|---|---|---|---|---|---|
| | | p-Di-iPrB | Mono ol | Diol | | p-Di-iPrB | Mono ol | Diol |
| 1 | 7 | 100 | | | 459 | | | |
| 2 | 7 | 88.2 | 9.6 | 0.2 | 423 | 45.1 | 32.4 | 22.5 |
| 3 | 7 | 73.2 | 23.9 | 0.9 | 314 | 20.0 | 30.6 | 49.4 |
| 4 | 7 | 40.2 | 47.5 | 10.3 | 373 | 6.3 | 28.2 | 65.5 |
| 5 | 7.3 | 63.9 | 32.6 | 1.5 | 489 | 6.0 | 29.9 | 64.0 |

Note.—Hydroperoxide concentration remained at about 2 wgt. percent of the organic phase from the end of the first cycle onward.

EXAMPLE 5

Our process is effective upon each of three tertiary aliphatic carbon atoms attached to the same benzene nucleus as in 1,3,5-triisopropylbenzene, from which by our process $a^1,a^1,a^3,a^3,a^5,a^5$-hexamethyl - $a^1,a^3,a^5$ - mesitylenetriol is obtained, i.e. the tricarbinol of formula

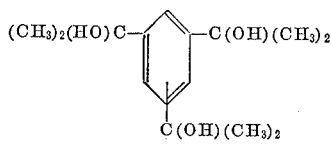

Previously it has been proposed to obtain this compound by complicated routes such as trimerization of 3-methyl-1-butyne-3-ol, etc.

In a 1500 ml. resin pot, 400 ml. of 1,3,5-triisopropylbenzene and 200 gms. of aqueous 40% NaOH solution were stirred at 500 r.p.m. and 110° C. while oxygen was bubbled through at flow rate of 50 liters per hour.

Periodic samplinng, separation of layers, and analysis of the organic layers by vapor fractometer showed the compositions at successive times given in Table V below, wherein "Monocarbinol" is 3,5-diisopropylphenyl dimethyl carbinol, "Dicarbinol" is 3,5 - bis - (alpha-hydroxyisopropyl)-cumene, and "Tricarbinol" is the above identified hexamethylmesitylenetriol.

TABLE V

| | Composition of organic phase, wgt. percent | | | Percent hydrocarbon reacted |
|---|---|---|---|---|
| | Monocarbinol | Dicarbinol | Tricarbinol | |
| Hours of reaction: | | | | |
| 6.5 | 45 | 39 | 5 | 89 |
| 23 | 19 | 48 | 31 | 98 |
| 31 | 14 | 46 | 39 | 99 |
| 47 | 16 | 44 | 40 | (¹) |

¹ All but a trace.

The product obtained after 47 hours was a thick slurry. By recrystallization from sym. dichloroethane the tricarbinol and the dicarbinol were obtained in high state of purity. Only about 0.3% of hydroperoxide was found in the products of the above operations of this example.

We claim:
1. Process for oxidizing the compound phenylcyclohexane to form a tertiary alcohol, said process consisting essentialy of intimately contacting said compound in the liquid phase with an elemental oxygen containing gas and with an aqueous solution of sodium hydroxide or potassium hydroxide in a concentration of about 40 to 90 weight percent in said aqueous solution, said solution being present in an amount of about 20 to 400 g. per 100 ml. of said compound at a temperature ranging about 120° C.–150° C.

2. Process for oxidizing the compound beta-isopropylnaphthalene to form a tertiary alcohol, said process consisting essentialy of intimately contacting said compound in the liquid phase with an elemental oxygen containing gas and with an aqueous solution of sodium hydroxide or potassium hydroxide in a concentration of about 40 to 90 weight percent in said aqueous solution, said solution being present in an amount of about 20 to 400 g. per 100 ml. of said compound at a temperature ranging about 130° C.–150° C.

3. Process for oxidizing the compound p-diisopropylbenzene to form a tertiary alcohol, said process consisting essentialy of intimately contacting said compound in the liquid phase with an elemental oxygen containing gas and with an aqueous solution of sodium hydroxide or potassium hydroxide in a concentration of about 40 to 90 weight percent in said aqueous solution, said solution being present in an amount of about 20 to 400 g. per 100 ml. of said compound at a temperature ranging about 100° C.–130° C.

4. Process for oxidizing the compound m-diisopropylbenzene to form a tertiary alcohol, said process consisting essentialy of intimately contacting said compound in the liquid phase with an elemental oxygen containing gas and with an aqueous solution of sodium hydroxide or potassium hydroxide in a concentration of about 40 to 90 weight percent in said aqueous solution, said solution being present in an amount of about 20 to 400 g.

per 100 ml. of said compound at a temperature ranging about 100° C.–130° C.

5. Process for oxidizing a compound selected from the group consisting of 1,3,5-triisopropylbenzene; 3,5-dissopropylphenyl dimethyl carbinol; 3,5-bis-(alpha-hydroxyisopropyl)-cumene; and mixtures thereof to form a tertiary alcohol, said process consisting essentially of intimately contacting said compound in the liquid phase with an elemental oxygen containing gas and with an aqueous solution of sodium hydroxide or potassium hydroxide in a concentration of about 40 to 90 weight percent in said aqueous solution, said solution being present in an amount of about 20 to 400 g. per 100 ml. of said compound at a temperature ranging from about 100° C.–130° C.

References Cited
UNITED STATES PATENTS

| | | | |
|---|---|---|---|
| 2,548,435 | 4/1951 | Lorand et al. | 260—610B |
| 2,713,599 | 7/1955 | Larand | 260—618C |
| 3,227,765 | 1/1966 | Lokey | 260—618C |

BERNARD HELFIN, Primary Examiner

J. E. EVANS, Assistant Examiner

U.S. Cl. X.R.
260—93.5, 524, 610